(12) United States Patent
Russell

(10) Patent No.: US 10,835,070 B2
(45) Date of Patent: Nov. 17, 2020

(54) SAFE MAIL DELIVERY BY UNMANNED AUTONOMOUS VEHICLES

(71) Applicant: David Wayne Russell, Winter Garden, FL (US)

(72) Inventor: David Wayne Russell, Winter Garden, FL (US)

(73) Assignee: USDrobotics, Inc., Orlando, FL (US)

( * ) Notice: Subject to any disclaimer, the term of this patent is extended or adjusted under 35 U.S.C. 154(b) by 201 days.

(21) Appl. No.: 16/089,354

(22) PCT Filed: Mar. 31, 2017

(86) PCT No.: PCT/US2017/025444
§ 371 (c)(1),
(2) Date: Sep. 27, 2018

(87) PCT Pub. No.: WO2017/173311
PCT Pub. Date: Oct. 5, 2017

(65) Prior Publication Data
US 2019/0125116 A1     May 2, 2019

Related U.S. Application Data

(60) Provisional application No. 62/316,038, filed on Mar. 31, 2016.

(51) Int. Cl.
*A47G 29/14* (2006.01)
*B64C 39/02* (2006.01)
(Continued)

(52) U.S. Cl.
CPC .......... *A47G 29/14* (2013.01); *A47G 29/141* (2013.01); *A47G 29/16* (2013.01); *B64C 39/02* (2013.01);
(Continued)

(58) Field of Classification Search
CPC .. A47G 29/1201; A47G 29/14; A47G 29/141; A47G 29/20; A47G 2029/143; A47G 2029/145; A47G 2029/146; A47G 2029/148; A47G 2029/149; A47G 29/16; A47G 29/30; B64C 39/02; B64C 39/024; B64C 2201/128; B64D 1/02; B64F 1/12; B64F 1/32; B65G 51/04; G06Q 10/083
(Continued)

(56) References Cited

U.S. PATENT DOCUMENTS 9,527,605 B1    12/2016   Gentry et al.
2013/0264381 A1*  10/2013  Kim ................... A47G 29/122
                                                              232/24

(Continued)

*Primary Examiner* — William L Miller
(74) *Attorney, Agent, or Firm* — Westberg Law Offices

(57) ABSTRACT

Operation of Unmanned Autonomous Vehicles (UAVs) around human population requires the utmost level of safety. Trackpath pre-computed navigation paths and Free flight corridor protection systems reduce the possibility of injuring humans during flight, but at the point of delivery the drone must, by necessity, come down to level of and near humans. This invention teaches the system and method of a personal household mail system that minimizes human exposure to the delivery UAV, provides a method of verifying that the addressee is correct, and optionally secures the mail until it is picked up by the designated recipient.

31 Claims, 4 Drawing Sheets

(51) Int. Cl.
*B64F 1/32* (2006.01)
*B64F 1/12* (2006.01)
*B64D 1/02* (2006.01)
*B65G 51/04* (2006.01)
*A47G 29/16* (2006.01)

(52) U.S. Cl.
CPC .............. *B64C 39/024* (2013.01); *B64D 1/02* (2013.01); *B64F 1/12* (2013.01); *B64F 1/32* (2013.01); *B65G 51/04* (2013.01); *B64C 2201/128* (2013.01)

(58) Field of Classification Search
USPC .................. 232/19, 24, 25, 34–36, 45, 43.4; 340/569, 568.1, 5.73; 244/114 R, 118.1, 244/118.2, 137.1, 137.4; 200/61.63; 705/330
See application file for complete search history.

(56) References Cited

U.S. PATENT DOCUMENTS

| | | |
|---|---|---|
| 2015/0120094 A1 | 4/2015 | Kimchi et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0317596 A1* | 11/2015 | Hejazi ................. G06Q 10/083 705/330 |
| 2015/0317597 A1 | 11/2015 | Shucker et al. |
| 2015/0332206 A1 | 11/2015 | Trew et al. |
| 2016/0157653 A1 | 6/2016 | Manitta |
| 2016/0235236 A1* | 8/2016 | Byers .................. A47G 29/141 |
| 2016/0257423 A1* | 9/2016 | Martin ..................... B64F 1/00 |
| 2018/0225628 A1* | 8/2018 | Roy .................... G07C 9/00912 |
| 2019/0009906 A1* | 1/2019 | von Gostomski ..... A47G 29/14 |
| 2019/0233135 A1* | 8/2019 | Cantrell .................. B64F 1/005 |
| 2019/0325683 A1* | 10/2019 | Tovey ................ G07C 9/00912 |

* cited by examiner

SAFE MAIL DELIVERY BY UNMANNED AUTONOMOUS VEHICLES

CROSS-REFERENCE TO RELATED APPLICATIONS

U.S. 62/316,038 31 Mar. 2016

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMP ACT DISK APPENDIX

Not Applicable

FIELD

This invention relates generally to the field of automatic or autonomous vehicles and more specifically to a safe system and method of mail delivery by unmanned aerial vehicle.

BACKGROUND

Package delivery is currently being investigated by a number of business entities as a way of lowering costs. Government backed postal services, at the same time, are experiencing significant revenue reduction due to the popularity of electronic mail for from everything from bill payment to personal communication. Governments are loath, however, to suspend daily mail service but at the same time are constantly facing revenue shortfalls and rising prices.

This invention details how delivery to homes and businesses can be safely completed via Unmanned Aerial Vehicle (UAVs) in a completely automated manner thereby significantly reducing cost.

In this invention safety is of the utmost concern, the principal means of safety being providing adequate distance between the UAV and the public at large. The second means of safety is to utilize pre-programmed highly accurate 4-Dimensional trajectories hereafter referred to as a trackpath. These trajectory data objects provide a method with which to communicate the navigational path, speed, and timing to the UAV.

In addition the trackpath provides a Free Flight Corridor (FFC) or Inverse-Geofencing data construct, outside of which the UAV may not operate. One familiar with the art would see that the manner of flight guidance could vary without altering the intent of the invention.

A system is needed which can deliver mail via an automated system in a controlled, safe, and efficient manner.

BRIEF SUMMARY OF THE INVENTION

Mail delivery, at first look, can be a highly complex task to automate because of all the variables such as unknown quantities of mail, mixes of envelopes and small packages, and many loose items. One common factor that simplifies this to a manageable problem is the size of the standard postal mailbox.

In accordance with an embodiment, a mail delivery structure is designed to allow for UAV delivery of packaged mail carriers at a height which keeps humans in the area safe. The structure can include decorative structures such as but not limited to flower baskets, lighting, and/or house number. The structure can include power connections, amorphous or crystalline silicon solar cells, wind, batteries, or other electrical generation or storage apparatus. The structure can include electronic control apparatus to assist in docking, provide information to the UAV, and/or provide illuminated, visual, sonic, and/or wireless notification to the addressee that a delivery has been made. The structure can include a docking collar designed to adjust for slight misalignment of the UAV and the delivery structure. The docking collar or structure can be equipped with a human and/or machine readable label which can confirm the addressee. The docking collar or other part of the structure can be equipped with a reflective, IR, visible light, magnetic, metallic, or wireless target to assist the UAV in fine positioning. A lift capability can be included to return emptied carriers to the UAV. A structure that is out of service and/or has no further storage capacity and/or other information can communicate such status to the UAV and/or the postal authority and/or a third party. The rate of descent of the letters, boxes, or carrier can be controlled through the structure. The structure can be designed to receive a mail carrier carton or other container within which the random pieces of mail are carried. The structure of can be registered with the mail carrier system and/or the postal service and/or a third party with accurate geographic coordinates and/or mail recipient information. The structure can be designed to shunt or divert rainwater away from the mail carriers and/or prevent it from collecting in the container. The structure can support an affixed a standard horizontal access mail container 170 conforming to US Postal Service guidelines or those of other postal organizations as appropriate.

In one embodiment a structure similar to a US Postal Service "Cluster Box" is envisioned which simultaneously services a number of households within a given area. The top of the cluster box, through which the UAV will deposit the mail, may be approximately 3 meters in height, keeping the UAV away from the majority of the populace as well as pets and children. Another embodiment dubbed a "Drone Pipe" is a cylindrical structure which may be approximately 3 meters in height. In this case the drone does not actually land on the structure, but drops the mail carrier packet while in hover flight mode.

This creates additional complexity in that the drop must be made while external forces such as wind are actively affecting the platform and compensation must be processed and applied at high speeds. While the height of the box does serve to keep personnel and animals away from the UAV platform, other mechanisms such as but not limited to fences, caution tape, concrete barriers, the time of delivery, or otherwise limited access areas could be utilized.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical components or features.

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION OF INVENTION

The following detailed description illustrates embodiments of the invention by way of example and not by way of limitation. The description clearly enables one skilled in the art to make and use the disclosure, describes several embodiments, adaptations, variations, alternatives, and use of the disclosure, including what is currently believed to be the best mode of carrying out the disclosure. The disclosure is described as applied to an exemplary embodiment namely, systems and methods for the creation of a safe vehicle control system. However, it is contemplated that this disclosure has general application to vehicle management systems in industrial, commercial, military, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The different illustrative embodiments recognize and take into account a number of different considerations. "A number", as used herein with reference to items, means one or more items. For example, "a number of different considerations" means one or more different considerations. "Some number", as used herein with reference to items, may mean zero or more items.

Figure 1:
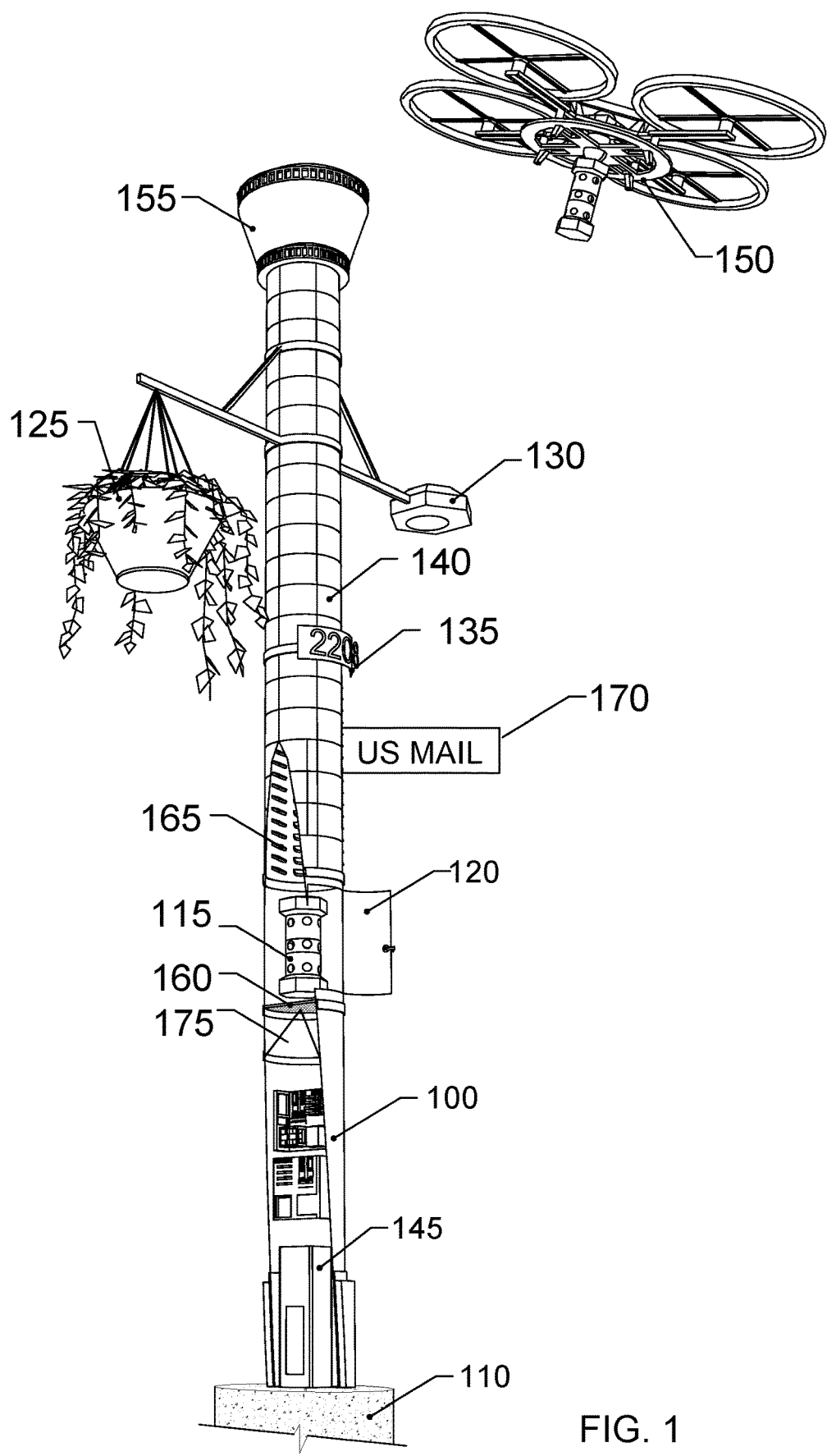
FIG. 1. Depicts a drone pipe residential mail receptacle.

FIG. 1. depicts one embodiment of the invention where a cylindrical pipe 100 is attached vertically to a concrete pad 110 or other structure to achieve stability. In one embodiment the inner dimension of the pipe is approximately eight inches (200 mm) in diameter and uses gravity to transport the Mail Carrier Carton (MCC) 115 to the outer door 120. The outer door may optionally be equipped with a locking mechanism. In another embodiment the structure could be rectangular and use some other method such as an elevator to transport a mail carrier. The primary purpose of the structure is to provide an access controlled target for an Unmanned Aerial Vehicle (UAV) such that the vehicle is less likely to come into direct contact with persons or animals, in order to keep human bystanders safe. Height is one of a number of mechanisms which can be utilized to meet the limited access criteria.

In one embodiment the Mail Carrier Carton (MCC), in order to match the dimensionality of the drone pipe is a cylinder approximately 8" or 200 mm in diameter and 12" or 300 mm in length, made of cardboard or other inexpensive and/or recyclable material. Long distance transfer of mail could continue in its current form, as this is already highly automated and utilizes little human labor. Long distance transfers as well as movement within a sorting and/or distribution facility could be automated as well.

Once the mail reaches the final distribution center, collections of individual household mail can be automatically or manually sorted into the MCCs and loaded into Application Specific Autonomous Vehicles (ASAV) usually but not limited to an autonomous Unmanned Aerial Vehicle. The ASAV could also be a combination of road and aerial vehicles, manned or unmanned.

As each MCC is loaded, the bay within the vehicle is opened on command from the distribution computing center, which communicates with the sorting system of the postal service such that the address of the recipient is logged along with the UAV and bay to which the MCC is assigned. It is possible that an array of bays in multiple layers could be constructed within the same ASAV.

As each address is logged by the postal service sorting system, the location of the associated delivery structure (if it exists) is also retrieved from a common database. Households which do not have safe landing structures would continue to require manual delivery, and potentially be assessed a tax accordingly.

If the delivery structure exists, trackpath distribution software would calculate the navigation and safety related data necessary for the UAV to complete its deliveries in a reasonably efficient manner. The final trackpath is loaded into the UAV memory and it is given a time to begin its flight program which synchronizes its movements with other known vehicles in the system.

In one embodiment a cluster box of MCC receptacles would service a neighborhood area. The ASAV might navigate to the location of the receiver structure and land on top. A registration marker visible to or detectable by the ASAV would guide the platform to an accurate landing location and orientation. A small motor driven by solar or other power source, internal or remote, could then open the receptacles on the drop box, including several rows as well as columns and layers as would be supported by the ASAV. In another embodiment if a single column is allocated to each recipient, or the weight of the vehicle itself could be used to manipulate a mechanical lever, power may not be required for the structure.

One issue that arises in this embodiment is mail that has not yet been picked up by the recipient. This would preclude any further deliveries to that receptacle or any beneath it. This could be temporarily alleviated by either a sloped inner channel which can receive more than one package, or by having a single vertical stack taller than one receptacle for each user. In the end, however, it is always possible that a receptacle fills and cannot receive another MCC.

Where there is some power to the box it could sense a full receptacle and notify the UAV of that fact when it lands via a low power short range broadcast medium such as but not limited to BlueToothLE. In another embodiment sensors within the ASAV could detect the amount of room available in the receptacle. The ASAV would then withhold delivery of the MCC and return it along with the blocked receptacle information to the distribution center. This might also mean, depending on the configuration of the UAV and structure, that other MCCs above or below the blockage could not be delivered either. These would be recirculated to the next delivery. After that, no further deliveries to that receptacle would be scheduled until the blocked message was cleared. It would also be possible for one of the manual delivery personnel to retrieve the blocking MCCs and return them to the distribution center along with other mail being held. A note might be left in the receptacle notifying the user of the pending mail delivery.

In another embodiment the standard postal mailbox is replaced by a tubular structure of the proper diameter to receive one or more MCCs and in this embodiment a height of approximately 3 meters. Again, this height protects most of the populace from proximity to the UAV. Because of the small size of the landing platform the ASAV does not land, but goes into a hover above the marker that is visible to or otherwise detectable by the UAV. It can then translate its position and orientation to alight to the proper delivery bay.

If there is power to the drone pipe it could open its receptacle, notify if it is full, and perform other functions. With no power, a lever at the top of the drone pipe is actuated which opens the receptacle top, or power or other motive force could be applied by the ASAV. The MCC is then dropped into the structure and the lid closes as a mechanical timer expires. The user can then open the side of the structure and remove the contents just as with any mailbox. In another embodiment the door could be secured with a key or other lock to secure the contents until the recipient arrives. With a height of 3 meters, the drone pipe could receive a number of MCCs before filling, but once filled a protocol similar to the cluster box would need to be followed.

If the MCCs are made of a durable plastic, they could be disposed of in standard waste services recycling containers, and the waste reclamation facility will sort them from the other recyclables and return them to the distribution center. If made from cardboard or other disposable material, they could be recycled.

In one embodiment the structure may be in use in an urban, suburban, or rural home site and as such may be decoratively adorned such as but not limited to a hanging flower basket 125, street light 130, and house number placard 135. In some instances the assemblage may be painted or otherwise decorated, in others the assembly may be hard-wired to a power source or the pipe assembly may be coated in a power-generating system such as amorphous silicon solar coating 140 or crystalline silicon cells. These power sources may be used to charge a battery 145 for lighting or other intelligence and/or guidance functions for the UAV 150.

In another embodiment that pole could also support a standard mailbox at the customary height to also support ground based mail carriers, whether automated or human.

In use, the exact location of the pipe is registered with the mail carrier service and a trackpath to that location, as part of a trackpath to potentially many other locations in the same trip, is calculated in advance and loaded into the mail carrier UAV along with the mail carrier tubes, creating a 1:1 relationship between the mail carrier tube, the tube's location within the carrier, and the address designation of the drone pipe.

As the carrier nears the location short distance visible or RF or other detectable communication protocols are used if necessary to guide the carrier with a high degree of accuracy to the docking collar 155 on the top of the pipe. This collar serves several purposes, first it may be conically shaped to compensate for any slight inaccuracies or induced motion from external forces in the positioning of the carrier. Second, it may provide a unique landing tag, which may or may not be visible to humans, which verifies the address of the pipe. Third, it may provide one or more landing targets in forms such as but not limited to NFC emitters, IR or visible light emitting diodes, metallic or magnetic positioning probes, or visible light beacons. These targets assist the UAV in very fine positioning between the appropriate carrier slot on the carrier and the pipe.

Once the address has been confirmed and the positioning is sufficiently accurate, the door in the bottom of the carrier opens and the mail carrier falls into the pipe. In another embodiment a spring or gas discharge system may help propel the carrier into the pipe. In another embodiment a LASER, audio, or other proximity detection device could warn that the pipe is obstructed and abort the mail delivery. In another embodiment the pipe itself could be sufficiently instrumented to inform the delivery carrier that obstructions exit or other cases such as vacationing homeowners are presented that deny delivery to the carrier and potentially can transmit additional data such as forwarding address or time to resume delivery to the carrier, which in turn would transmit or otherwise transfer the data back to the postal service.

Once the mail carrier is dropped into the pipe, gravity carries it down to the stop grating 160 or to the top of however many mail carriers are still extant in the pipe. The inside of the pipe may be lined with plastic fingers 165 or other structures to retard the speed of the mail carrier as it falls.

In another embodiment in rainy environments a structure 175 could be included to shunt rainwater to one or more drain tubes within the structure and that water could be used to turn a small turbine device to generate electrical power for the structure. In another embodiment a light or transmission device such as but not limited to BlueTooth, WiFi, or cellular network SMS could be utilized to inform the addressee that one or more mail carriers have been delivered.

Figure 2:
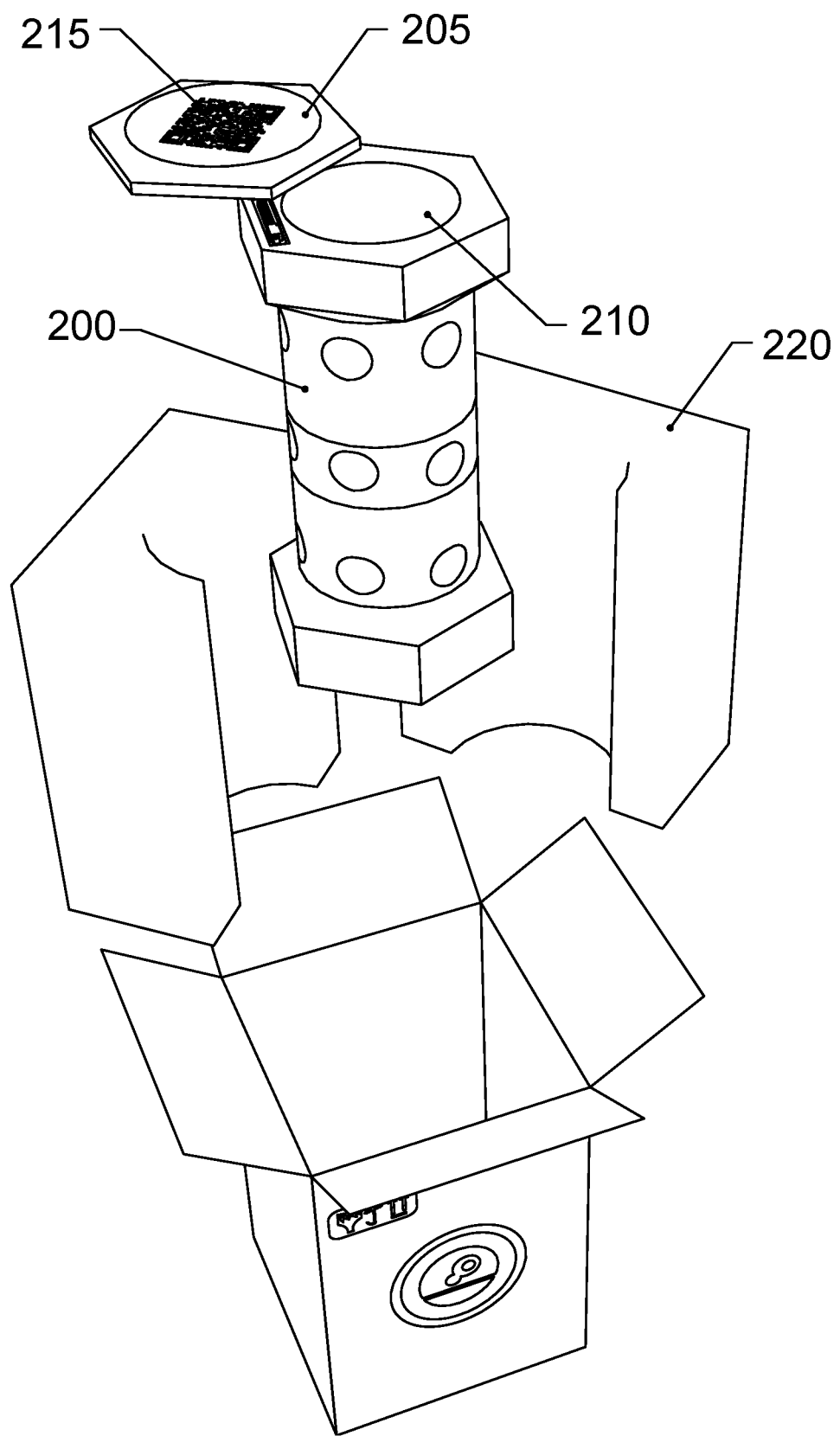
FIG. 2. Depicts a sloped, multi-tier, cluster mail receptacle.

FIG. 2 depicts one embodiment of a mail carrier 200, similar in function to the pneumatic carriers used in banking and office functions but constructed of lightweight materials such as but not limited to cardboard, plastics, or foam. In order to facilitate loading of the carrier, the top 205 may rotate up to 180 degrees to reveal an opening 210 at least half the area of the carrier top. Recesses in the top allow mechanical actuators to rotate the top. An identification tag 215 such as but not limited to barcode, QR code, RFID, or other machine and/or human readable labeling is affixed to the carrier as it is loaded to identify the destination address of the contents.

In other embodiments the top may be completely removable, or may have only a slot for loading the mail content into the carrier. The address label may be reusable and/or electronics such as but not limited to E-Paper, OLED, LCD, or other display mechanism.

In use, once the carrier has been received by the addressee, it may be disposed of or recycled depending on the cost of the materials used. In one embodiment the carrier may be entirely constructed of cheap cardboard and simply recycled with other waste. In another embodiment that carrier may be placed in the normal recycling bin of the waste transport company, but it would be separated and returned to the postal office as part of the recycling operation. In another embodiment a deposit could be assessed and billed by the transport company which could be refunded as the carriers are returned. In another embodiment if some kind of power is available used containers could be pushed up the tube by an air jet, spring, or other mechanism so that the UAV could return used containers to the transport facility.

In one embodiment a soft sealing mechanism 220 such as but not limited to rubber, silicone, or specially fabricated cardboard could be used to help seal the tube within transport mechanisms used to setup, fill, load, and transport the carrier.

Figure 3:
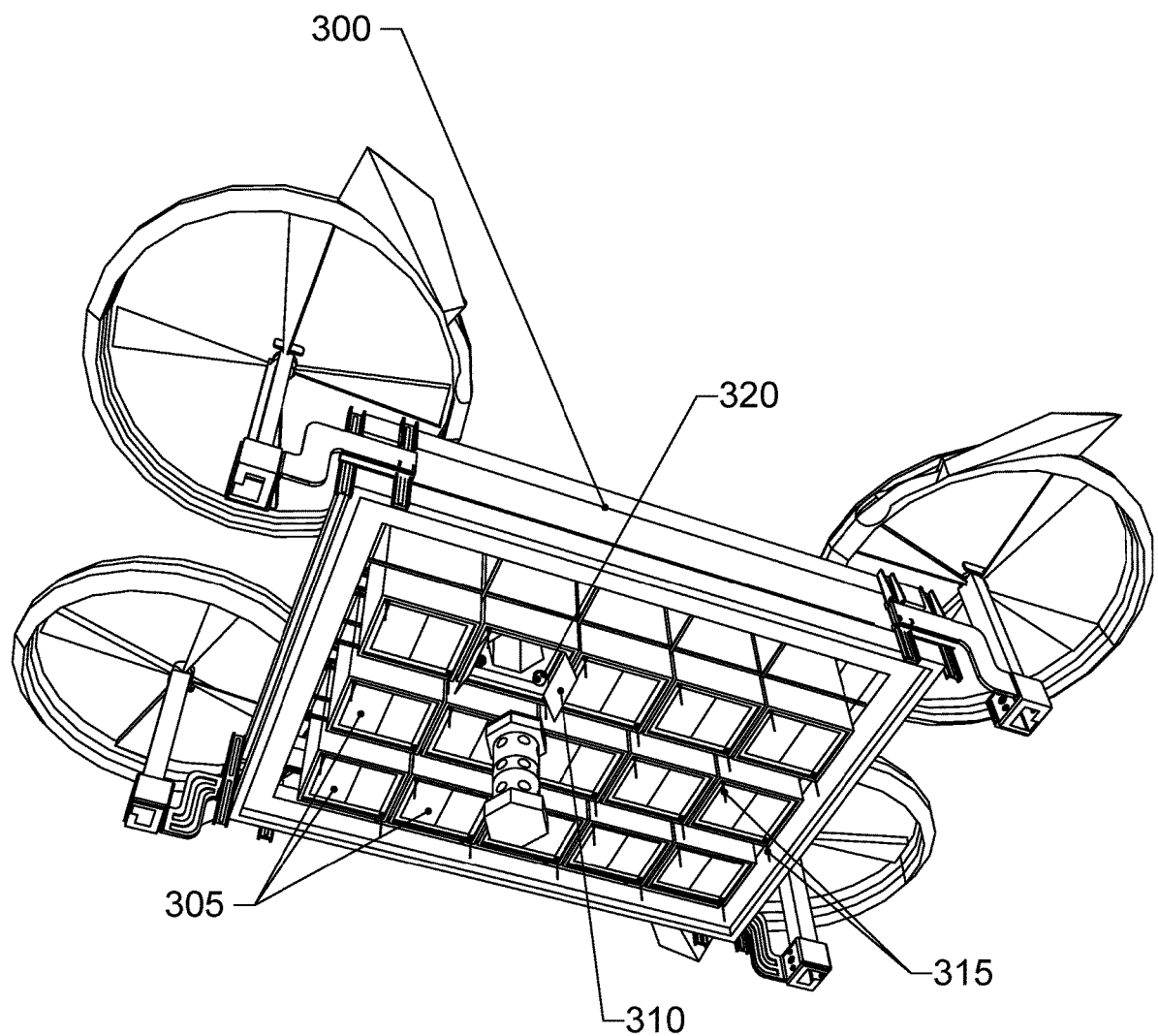
FIG. 3. Depicts a Mail Carrier Carton (MCC).

FIG. 3 depicts one embodiment of a safe UAV mail carrier 300. In this embodiment the mail carriers are loaded into a row, column, and potentially layered configuration at the bottom of the UAV. Each mail carrier slot 305 consists of an internal tube, door 310, and one or more close position sensors 315. An optical or other positioning sensor 320 is used to identify and validate the address tag on the drone pipe, and then the close proximity sensors are used to accurately position the drone over the pipe. In another embodiment a moveable mechanical tube acting as ovipositor could be used to extract one carrier at a time from the XY position on the carrier and move it to a standard location on the UAV such that only one close proximity location sensor structure would be needed for the entire UAV. In another embodiment the entire body of the UAV could be filled with mail carriers, in order, with one extraction point on the UAV and appropriate mechanisms within the UAV to transport and expel one carrier at a time.

Figure 4:
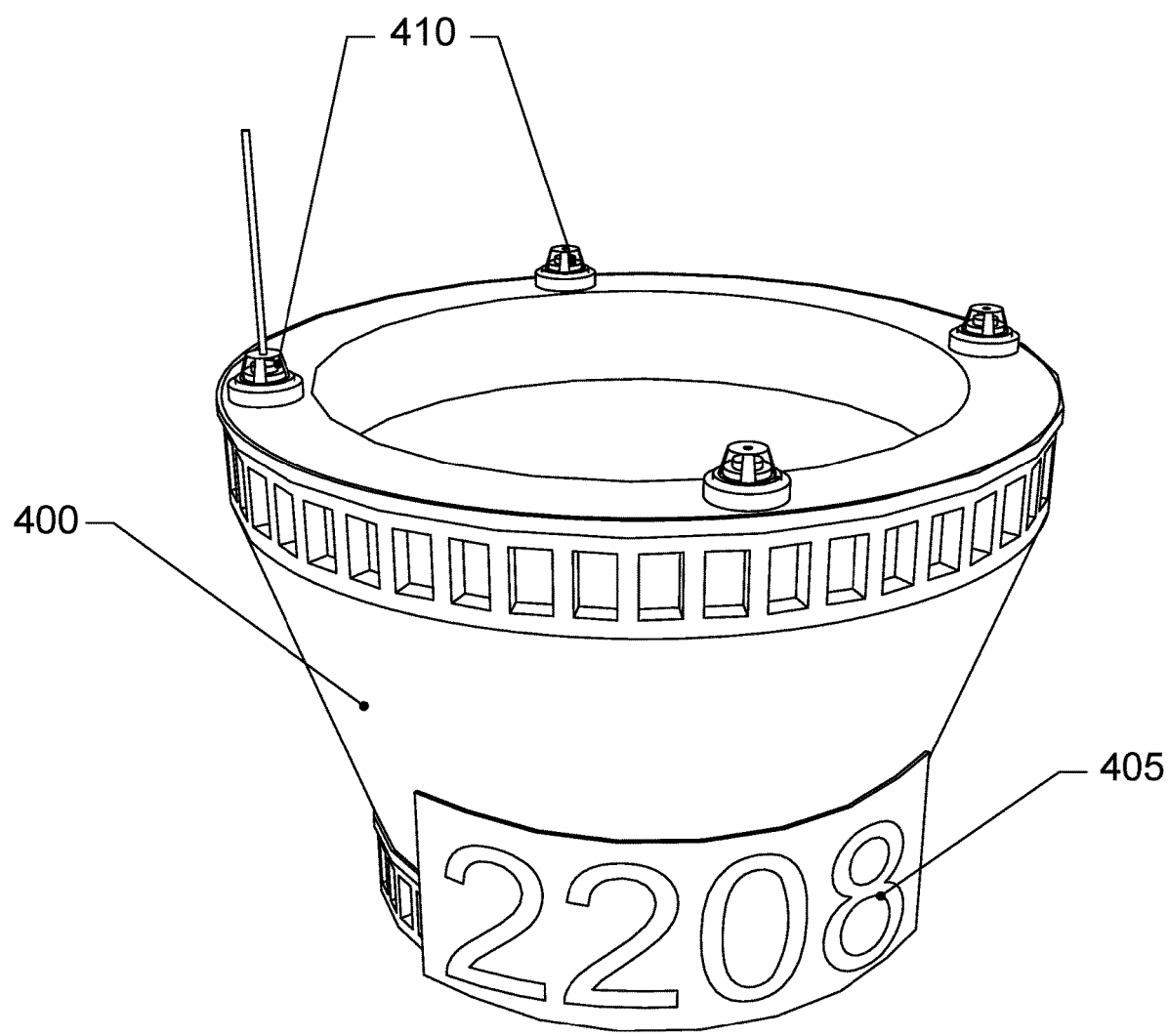
FIG. 4. Depicts a docking collar

FIG. 4 depicts one example of a docking collar 400, a conical flange at the top of the drone pipe to compensate for slight inaccuracies or movement of the UAV during delivery. The collar displays a machine and/or human readable address label 405 either on or affixed to the collar in a position which allows it to be read by the UAV and one or more close positioning sensors 410 which allow for accurate position and rotation estimation of the UAV's position with respect to the docking collar. These proximity tags may include but not be limited to reflective devices, IR or visible light beacons, magnets, metallic targets, NFC, or Blue Tooth LE.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The invention claimed is:

1. A method of delivering mail comprising:
providing a plurality of mail carrier containers of uniform dimensions, each mail carrier container having a unique identification;
associating the unique identification of each of the plurality of mail carrier containers with an addressee, each addressee having a respective delivery receptacle;
loading, at a centralized mail sorting facility, each of the plurality of mail carrier containers with mail intended for the corresponding addressee, the mail having various dimensions;
transporting the plurality of mail carrier containers from the mail sorting facility to the delivery receptacle of each addressee using an unmanned aerial vehicle; and
depositing each of the plurality of mail carrier containers into the delivery receptacle of each address using the unmanned aerial vehicle.

2. The method according to claim 1, wherein said depositing is performed while the unmanned aerial vehicle remains in flight.

3. The method according to claim 1, wherein at least one of the mail carrier containers is made from recyclable material.

4. The method according to claim 3, wherein the recyclable material comprises cardboard or plastic.

5. The method according to claim 1, wherein the mail carrier containers are cylindrical.

6. The method according to claim 5, wherein the mail carrier containers are approximately 8 inches in diameter and 12 inches in length.

7. The method according to claim 5, wherein the mail carrier containers have a rotatable portion that reveals an opening when rotated.

8. The method according to claim 1, further comprising providing notification to the addressee that a delivery has been made.

9. The method according to claim 1, further comprising signaling the unmanned aerial vehicle or providing reference markers to assist the unmanned aerial vehicle in positioning with respect to the delivery receptacle.

10. The method according to claim 1, further comprising returning empty mail carrier containers to the unmanned aerial vehicle.

11. The method according to claim 1, further comprising signaling the unmanned aerial vehicle that the delivery receptacle of at least one addressee is out of service or storage capacity.

12. The method according to claim 1, wherein the delivery receptacle of at least one addressee is of height sufficient to maintain persons on the ground at a safe distance from the unmanned aerial vehicle.

13. The method according to claim 1, wherein the delivery receptacle of at least one addressee is approximately three meters from the ground.

14. A system for delivering mail comprising:
a centralized mail sorting facility at which a plurality of mail carrier containers of uniform dimensions are provided, each mail carrier container having a unique identification and the unique identification of each of the plurality of mail carrier containers being associated with a corresponding addressee, wherein each of the plurality of mail carrier containers are loaded at the centralized mail sorting facility with mail intended for the corresponding addressee, the mail having various dimensions; and
an unmanned aerial vehicle configured to transport the plurality of mail carrier containers from the mail sorting facility to a respective delivery receptacle of each addressee and the unmanned aerial vehicle configured to deposit each of the plurality of mail carrier containers into the delivery receptacle of each addressee.

15. The system according to claim 14, the unmanned aerial vehicle is configured to deposit at least one of the plurality of mail carrier containers into the delivery receptacle of at least one addressee while the unmanned aerial vehicle remains in flight.

16. The system according to claim 14, wherein at least one of the mail carrier containers is made from recyclable material.

17. The system according to claim 16, wherein the recyclable material comprises cardboard or plastic.

18. The system according to claim 14, wherein the mail carrier containers are cylindrical.

19. The system according to claim 18, wherein the mail carrier containers are approximately 8 inches in diameter and 12 inches in length.

20. The system according to claim 18, wherein the mail carrier containers have a rotatable portion that reveals an opening when rotated.

21. The system according to claim 14, further comprising means for providing notification to the addressee that a delivery has been made.

22. The system according to claim 14, further comprising means for signaling the unmanned aerial vehicle or reference markers to assist the unmanned aerial vehicle in positioning with respect to the delivery receptacle of at least one addressee.

23. The system according to claim 14, wherein empty mail carrier containers are returned to the unmanned aerial vehicle.

24. The system according to claim 14, further comprising means for signaling the unmanned aerial vehicle that the delivery receptacle of at least one addressee is out of service or storage capacity.

25. The system according to claim 14, further comprising a delivery structure having one or more of the delivery receptacles for receiving the mail carrier containers.

26. The system according to claim 25, wherein a rate of descent of the carrier containers through the delivery structure is controlled.

27. The system according to claim 25, wherein geographic coordinates of the delivery structure are registered with the system.

28. The system according to claim 25, wherein the delivery structure is designed to shunt or divert rainwater away from the mail carrier containers and to prevent rainwater from collecting in the delivery structure.

29. The system according to claim 25, wherein the delivery structure comprises a horizontal access mail container for receiving hand-delivered mail.

30. The system according to claim 14, wherein the delivery receptacle of at least one addressee is of height sufficient to maintain persons on the ground at a safe distance from the unmanned aerial vehicle.

31. The system according to claim 14, wherein the delivery receptacle of at least one addressee is approximately three meters from the ground.

* * * * *